No. 792,773. PATENTED JUNE 20, 1905.
H. & J. W. HEGELER.
REGENERATIVE RETORT FURNACE.
APPLICATION FILED DEC. 12, 1903.
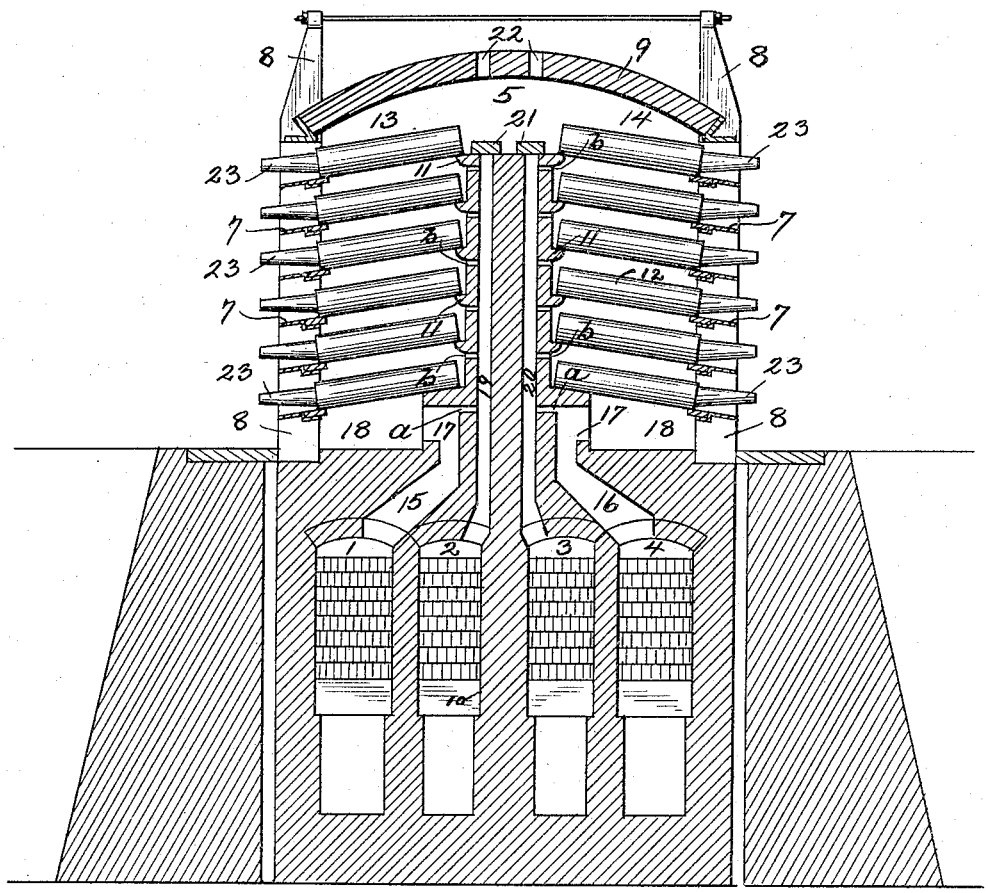

No. 792,773.

Patented June 20, 1905.

UNITED STATES PATENT OFFICE.

HERMAN HEGELER AND JULIUS W. HEGELER, OF LASALLE, ILLINOIS.

REGENERATIVE RETORT-FURNACE.

SPECIFICATION forming part of Letters Patent No. 792,773, dated June 20, 1905.

Application filed December 12, 1903. Serial No. 184,864.

*To all whom it may concern:*

Be it known that we, HERMAN HEGELER and JULIUS W. HEGELER, of Lasalle, in the State of Illinois, have invented certain new and useful Improvements in Regenerative Retort-Furnaces, of which the following is a specification.

Our invention relates to regenerative furnaces for heating zinc-distilling retorts or other like retort-furnaces; and the object of the improvements is to provide means by which an even and simultaneous heating of all the retorts in each section of the furnace and an even reduction and distillation of the metal in the retorts can be attained, thus attaining economy in time required to reduce the metal, a larger recovery of metal, and less fuel consumption and destruction of retorts, and also the construction for attaining these results.

One of the objects of recuperation or regeneration of heat in nearly all metallurgical work is to attain the highest possible temperature. In reduction and distillation processes in retorts, as in zinc-smelting, this intense heat is not required and is a disadvantage. To attain economy in fuel consumption and metal loss in smelting in retorts, it is necessary to heat all the retorts in the furnace uniformly and not to heat any retort to a higher temperature than is required to reduce the ore therein in the allotted time. The time required to reduce the ore in a retort is proportional to the difference between the internal and external temperatures of the retort, and the quantity of heat passing the retort in a given time has relatively little effect upon the quantity of ore reduced in the retort in that time. The internal temperature of a retort remains constant, or nearly so, while reduction and distillation are taking place. When all the ore in a retort is reduced, the retort takes the temperature of the external gases and when so exposed may be seriously damaged. The higher the external temperature the more serious will be the damage done the retort and the greater the subsequent loss of metal.

At present the Siemens regenerative retort-furnace is limited in height to five tiers of retorts, and the upper tiers are charged with the less-refractory oxides or blue powder, as it is impossible to uniformly heat the different tiers of retorts. The lowermost tiers of retorts are subjected to an intense heat, with the result that the ore in them is reduced more quickly than in the upper tiers, and then either much ore is left in the upper tiers or the lower tiers thereafter are heated to this intensely-high temperature and seriously damaged in attempting to reduce all the ore in the upper tiers, and the capacity of the furnace is limited by all the retorts not working to the best advantage at all times. By our improvement control of the temperature throughout the full height of the furnace is attained, and the number of tiers of retorts is limited only by the draft and the practical height of furnace construction.

In the common form of regenerative retort-furnaces in which the products of combustion pass upward through one part of the retort-chamber and downward through the opposite part among tiers of retorts arranged in vertical rows the preheated air and combustible gases are introduced into the base of the combustion-chamber through a series of separate flues which are arranged for air and gas alternately along the length or horizontal extension of the furnace, connected alternately with the air and gas regenerators, and provided with ports or openings into the base of the combustion-chamber. By this means all the gas and all the air enter for combustion at the bottom of the combustion-chamber and there is produced at the place of combustion under the bottom tier of retorts the temperature of the combustion of preheated elements undiluted by excess of either gas or air. The products of the complete combustion as they pass each tier of retorts are gradually cooled, and there is consequently an uneven heating of the retorts and an uneven distillation and reduction of the metal. Not only is the metal in the lower tiers of retorts more quickly reduced, but said retorts are injured thereafter by the intense heat in the lower part of the combustion-chamber.

Another form of regenerative retort-furnace having a central division-wall provides a series of separate air and gas flues arranged in the same planes longitudinally of the division-wall with ports or openings into the combustion-chamber on the opposite sides and at different heights which severally admit into each side a part of the gas and part of the air in different vertical columns under the bottom tier of retorts, a part between the bottom and second tiers, and a part between the second and third tiers. The effect and operation of this construction are to produce under the lowermost tiers of retorts the temperature of the combustion of preheated elements undiluted by the presence of an excess of either gas or air, as in the previous case, but a lesser quantity of heat is produced at the several places of combustion in the lower part of the combustion-chamber by decreasing the amount of gas and air entering there in combustion, and an increase in temperature is produced at the upper tiers of retorts by the gas and air entering there in combustion. In this case the products of combustion in the lower part of the combustion-chamber in passing the different tiers of retorts are cooled and the temperature above is increased by the addition of gas and air there; but the products of combustion cannot by this means be again brought to the temperature existing under the bottom tier of retorts. Thus, as in the previous case, the retorts are unevenly heated, and there is an uneven reduction and distillation of the metal. The lower tiers of retorts reduce the ore sooner than the upper ones and then are exposed to a detrimentally high temperature and are often melted down and deteriorate quickly, in practice the lower retorts lasting less than half as long as the upper ones.

By our improvement we propose to introduce the entire amount of the air at the bottom of the retort-chamber under the lower tier of retorts and to have an excess of air up to the top of the combustion-chamber and to introduce the gases separately from the air at different heights above the air-ports to produce the combustion progressively as required in order to heat all the retorts simultaneously and uniformly to the temperature required and reduce the ore in all of them at the same rate, and we attain this result by means of the construction illustrated in the accompanying drawing, which shows a vertical cross-section of a regenerative retort-furnace containing our improvement.

In the drawing the regenerators 1, 2, 3, and 4 are located under the combustion-chamber 5. Said chamber is of ordinary construction, being formed of side walls having cast-iron frames comprising horizontal plates 7, supported in the usual manner by buckstaves 8, which also support the arch-roof 9. Extending up within the combustion-chamber is a central division-wall 10, which is provided with ledges 11, on which the closed ends of the retorts 12 rest, the open ends resting upon fire-clay bricks supported on the horizontal plates 7 of iron. The division-wall extends up toward the roof, and so divides the combustion-chamber into two compartments 13 and 14, which communicate with each other above the division-wall, and each compartment contains six tiers of retorts 12, arranged in vertical rows throughout the length or horizontal extension of said compartments.

The condensers 23 are of ordinary construction and connect with the open ends of the retorts, and the spaces around the retorts and between the buckstaves 8 and horizontal plates 7 are filled with clay in the usual manner.

The furnace is provided on one side of the lower portion of the central division-wall with an air-regenerator 1 and a gas-regenerator 2 and on the other side with a gas-regenerator 3 and an air-regenerator 4, all of ordinary construction, and these regenerators lead through the regular pits to the ordinary reversing-valves, which are not shown. A series of short flues 15, connected with the air-regenerator 1 on one side of the furnace, extend upwardly in one side of the central division-wall, and a similar series of short flues 16, connected with the air-regenerator 4, extend upwardly in the other side of the said division-wall. Each of said flues 15 and 16 terminates at and leads through a single large port 17 into the space 18 of the lower part of the combustion-chamber beneath the lowermost tier of retorts. These flues 15 and 16, with their ports 17, are so constructed in order to throw the entire volume of air into the lower part of the combustion-chamber beneath the lowermost tier of retorts. A series of other flues 19, connected with the gas-regenerator 2 on one side of the furnace, extend straight up in one side of the central division-wall to the top thereof, and a similar series of flues 20, connected with the gas-regenerator 3, extend straight up in the other side of said division-wall to the top thereof. These are closed on top by cover-plates 21, which are arranged below the plug-holes 22 through the arch 9, said holes being arranged directly over the flues 19 and 20 and affording access to the cover-plates for the purpose of removing them and inspecting and cleaning the flues. Each of the said flues 19 and 20 has a port $a$ leading into the upper part of the ports 17 and the said space 18 beneath the ledges on which the lowermost tier of retorts rest and a series of preferably smaller ports $b$ beneath the several ledges on which the other tiers of retorts rest. The ports 17 and $a$ $b$ are severally under or in vertical line with the retorts.

The series flues 15 and 19 are arranged in different planes longitudinally of the retort-chamber compartment 13, as are also the several flues 16 and 20 in the opposite compartment 14, whereby a greater number of air and gas flues is made possible in a given length or horizontal extension of the furnace and a better distribution of the gases and heating is thereby attained. The ports 17 and $a$, having a common entrance into the combustion-chamber, afford a better mixing of the gases and air at that point. The flues 15 and 16 are very short and can be easily cleaned.

The gases by being admitted directly beneath the retorts are given a tendency to be distributed entirely across the full width of the furnace, and a uniform heating of the front and back of the retorts is attained thereby.

In operation the correct proportions of gas and air necessary for perfect combustion are admitted at the reversing-valves, and they pass, respectively, into and through the pits and flues, all in the ordinary manner. All the air after passing through and being preheated in the regenerator enters the lower part of the combustion-chamber 13 through the series of flues 15 and then pass up between the retorts 12, and the gases after passing through and being preheated in the regenerator 2 pass up through the series of flues 19 and enter the combustion-chamber 13 through the several ports $a$ $b$, which are so proportioned in size that the volume or quantity of gas entering through the series of ports $a$ in being consumed will bring the resulting mixture, which contains an excess of free oxygen until passing the uppermost of the ports $b$, up to the most advantageous zinc-making temperature, and the quantity of gas severally entering through each of the ports $b$ in being consumed will consecutively develop sufficient heat to counteract the cooling effect of each tier of retorts, and thus retain this advantageous temperature throughout the full height of the furnace. The consumed gases pass over the top of the central division-wall and down between the retorts 12 and through the ports $b$ and $a$ of the opposite side, to and through the regenerators on the opposite side, and thence to the reversing-valves and chimney in the ordinary manner, and when the valves are reversed, which is done every half-hour, the air and gas pass through the furnace in the opposite direction.

The operation may be reversed in the present furnace by admitting the entire amount of gas at the bottom of the combustion-chamber by means of the flues 15 and 16 and gradually adding the air in a similar manner to that above described for admitting the gas through the flues 19 and 20 and the several ports thereof.

We do not limit ourselves to the particular construction or location of the short flues and their ports, as the action would be the same if these flues connected the upper part of one of the regenerators at other points of the combustion-chamber below the lower tier of retorts than the base of the central division.

The long flues need not extend the full height of the central division-wall except for the special advantage specified.

By means of our improvement it is rendered practical to keep the temperature of the gases under the bottom tier of retorts the same as that passing the top tier. This is accomplished by admitting the entire volume of air to be used in combustion beneath the bottom tier of retorts and introducing thereto the correct amount of gas to produce the proper zinc-making temperature and as the gases are cooled in their passage up between the retorts adding under each tier of retorts the proper amount of gas to produce further combustion, and thereby maintain this desired temperature.

It should be noted that all the air enters at the bottom, and a larger proportion of the gases enter there also, so that the greater proportion of the total volume of gases entering and leaving the opposite divisions of the combustion-chamber does so under the bottom tier of retorts, and a better distribution of the gases and heat is thereby effected.

By means of our improvement it is rendered practical to control the temperature throughout the full height of the furnace, the number of tiers of retorts is not limited, the intense heat under the bottom tier of retorts is obviated, and the danger of damaging them or melting them down eliminated, there is a better distribution of the heat longitudinally and transversely, as well as vertically, and all flues can be conveniently inspected and cleaned. The construction of our furnace is differentiated from all others in that it has a regenerator under each compartment of the retort-chamber connected by a series of flues, which have ports communicating with the space of each compartment only beneath the lowermost tier of retorts therein, and another regenerator under each compartment of the retort-chamber connected with the space of each compartment by a series of other flues, which have several ports at different heights communicating with the space beneath the lowermost and other tiers of retorts, whereby all the air or gas for the entire combustion throughout the furnace is introduced directly and only beneath the lowermost tier of retorts, while the other element of combustion is introduced beneath the lowermost tier of retorts and at other places above between the several tiers of retorts, in order to have a large excess of gas or air in the lower part of the combustion-chamber to prevent the temperature of combustion going too high, and then to produce combustion progressively as desired by the addition of gas or air and consume this excess and have perfect combustion of the gases leaving the furnace.

What is claimed is—

1. In a regenerative retort-furnace of the class described, the combination with the two-compartment retort-chamber, the compartments communicating at the top, of regenerators located beneath each of said compartments, a series of flues connecting a regenerator with each compartment of the retort-chamber and communicating with the space therein below the lowermost tier of retorts only, and another series of flues connecting a regenerator with each compartment of the retort-chamber and having several ports at different heights and communicating with the spaces beneath the lower and other tiers of retorts, as and for the purpose specified.

2. In a retort heating, regenerative furnace of the class described provided with a retort combustion-chamber separated into compartments, communicating at the top, by a central division-wall and regenerators below said compartments, the flue construction comprising a series of short flues connecting a regenerator with the bottom of each of said compartments only beneath the lower tier of retorts therein and a series of flues extended from other of the regenerators upwardly in the central division-wall and provided with several ports communicating with said compartments, as specified.

3. In a furnace of the class described, having a retort combustion-chamber separated into compartments, communicating at the top, by a central division-wall and regenerators below said compartments, the flue construction comprising a series of short flues connecting regenerators at each side of the division-wall with the bottom of each of said compartments only beneath the lower tier of retorts therein and a series of long flues extended from other of the regenerators upwardly in the central division-wall and provided with several ports communicating with said compartments, the short and the long flues upon each side of the division-wall being arranged in different planes longitudinally of said compartments, as specified.

4. In a furnace of the class described, having a retort combustion-chamber separated into compartments, communicating at the top, by a central division-wall and regenerators below said compartments, the flue construction comprising a series of short flues connecting regenerators at each side of the division-wall with the bottom of each of said compartments only beneath the lower tier of retorts therein and a series of long flues extended from other of the regenerators upwardly in the central division-wall and provided with several ports communicating with said compartments, the short and the long flues upon each side of the division-wall being arranged in the same plane transversely of said compartments, as specified.

5. In a furnace of the class described, having a retort combustion-chamber separated into compartments, communicating at the top, by a central division-wall and regenerators below said compartments, the flue construction comprising a series of short flues connecting regenerators at each side of the division-wall with the bottom of each of said compartments only beneath the lower tier of retorts therein and a series of long flues extended from other of the regenerators upwardly in the central division-wall and provided with several ports communicating with said compartments, the ports of the short flues and the lowermost ports of the long flues having common entrance into said compartments under the lower tier of retorts, as specified.

6. In a furnace of the class described, having a retort combustion-chamber separated into compartments, communicating at the top, by a central division-wall and an outer and an inner regenerator below each of said compartments, the flue construction comprising a series of short flues connecting the outer regenerators with the space in the compartments only below the lower tier of retorts therein and a series of long flues connecting the inner regenerators with the spaces in the compartments below each tier of retorts, as specified.

7. In a furnace of the class described, having a retort combustion-chamber separated into compartments, communicating at the top, by a central division-wall and regenerators below said compartments, the flue construction comprising a series of short flues connecting a regenerator with the space in the compartments only below the lower tier of retorts therein and a series of long flues connecting a regenerator with the spaces in each compartment below each tier of retorts, said long flues extending to the top of the said division-wall, as specified.

8. In a furnace of the class described, having a combustion-chamber separated into compartments, communicating at the top, by a central division-wall and regenerators below said compartments, the flue construction comprising a series of short flues connecting a regenerator with the space in each of said compartments only beneath the lower tier of retorts therein and a series of long flues connecting a regenerator with the spaces in each of said compartments below each tier of retorts by means of ports arranged in vertical rows in line with the vertical rows of retorts, as specified.

HERMAN HEGELER.
JULIUS W. HEGELER.

Witnesses:
C. DIESTERWEG,
PAUL CARUS.